United States Patent
Johansson

(10) Patent No.: US 6,439,594 B1
(45) Date of Patent: Aug. 27, 2002

(54) METHOD AND A DEVICE FOR CHARGING, CARGO, SECURING AND DISCHARGING OF TRAILERS

(76) Inventor: Mats Johansson, Fågelkärrsvägen 13, S-440 74, Hjälteby (SE)

( * ) Notice: Subject to any disclaimer, the term of this patent is extended or adjusted under 35 U.S.C. 154(b) by 0 days.

(21) Appl. No.: 09/125,531
(22) PCT Filed: Feb. 20, 1997
(86) PCT No.: PCT/SE97/00281
§ 371 (c)(1), (2), (4) Date: Feb. 23, 1999
(87) PCT Pub. No.: WO97/30890
PCT Pub. Date: Aug. 28, 1997

(30) Foreign Application Priority Data

Feb. 20, 1996 (SE) .............................. 9600632

(51) Int. Cl.7 ............................... B62D 53/06
(52) U.S. Cl. .................. 280/425.1; 280/438.1
(58) Field of Search .............. 280/425.1, 434, 280/438.1; 410/56, 77, 80

(56) References Cited

U.S. PATENT DOCUMENTS

| 3,200,977 | A | * | 8/1965 | Thouvenelle et al. | .... 280/425.1 |
| 3,250,506 | A | * | 5/1966 | Thouvenelle et al. | .... 280/425.1 |
| 3,392,944 | A | * | 7/1968 | Wyrough | ............. 280/425.1 |
| 4,114,660 | A | * | 9/1978 | Arruda | ............. 141/98 |
| 4,807,714 | A | * | 2/1989 | Blau et al. | ............. 280/425.1 |
| 5,294,143 | A | * | 3/1994 | Jarvinen | ............. 280/425.1 |
| 5,383,630 | A | * | 1/1995 | Flatten | ............. 244/118.6 |

FOREIGN PATENT DOCUMENTS

FI          910899 A          8/1992

OTHER PUBLICATIONS

Patent Abstracts of Japan, vol. 13, No. 560, M–906, abstract of JP,A,1–233194 (Shigenobu Furukawa), Sep. 18, 1989.

* cited by examiner

Primary Examiner—Robert P. Olszewski
Assistant Examiner—Michael Cuff
(74) Attorney, Agent, or Firm—Lerner, David, Littenberg, Krumholz & Mentlik, LLP

(57) ABSTRACT

The invention relates to a method and a device for loading, securing and unloading trailers. In the method according to the invention. a device in the form of a trailer support (10) is utilized. The trailer support (10) comprises a supporting means (11) for supporting the front portion of a trailer, a coupling member (12) arranged on the trailer support (10) for coupling to a coupling means of a loading truck. The trailer. support also comprises a coupling means (13) for coupling to a coupling member of a trailer, Furthermore, the trailer support (10) comprises at least one lock device (14) for locking to at least one of a plurality of predefined locking points arranged in the floor (15) of a cargo space in order to achieve a securing of the front end of a trailer.

10 Claims, 5 Drawing Sheets

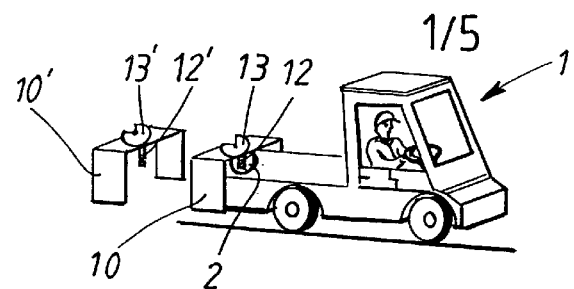
*A*
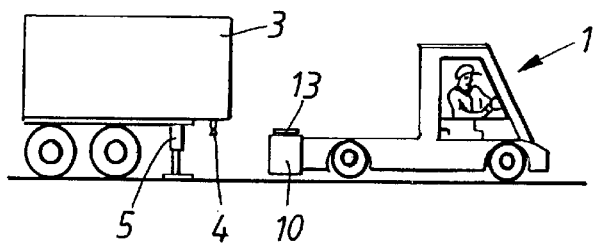
*B*
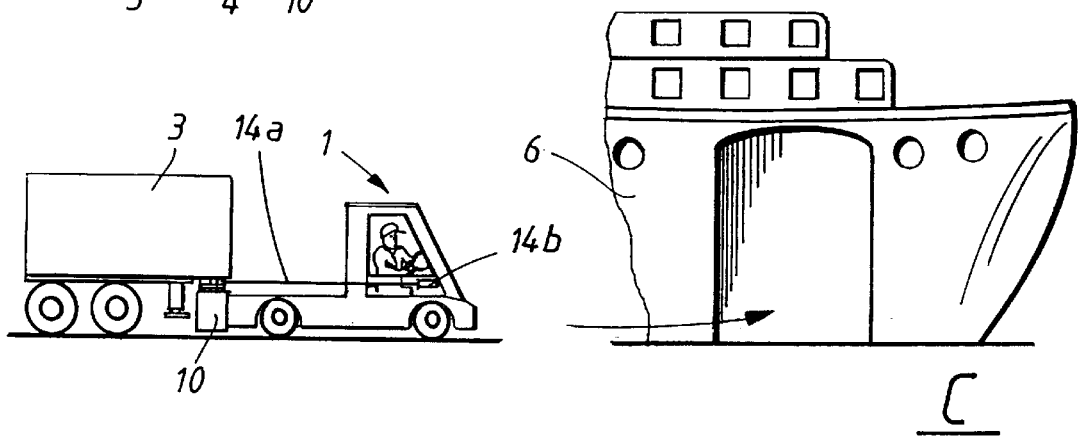
*C*
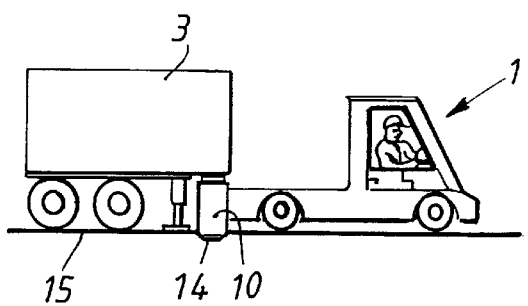
*D*
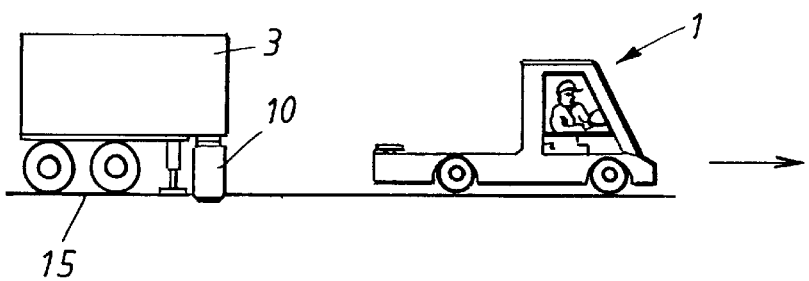
*E*
FIG. 1

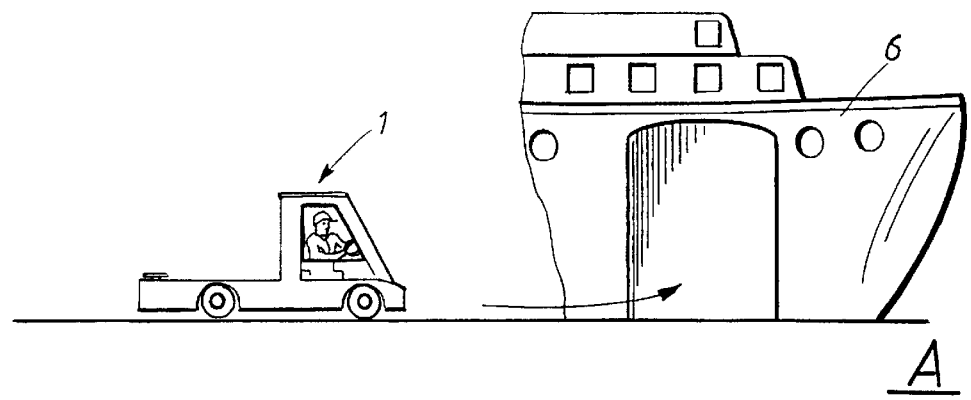
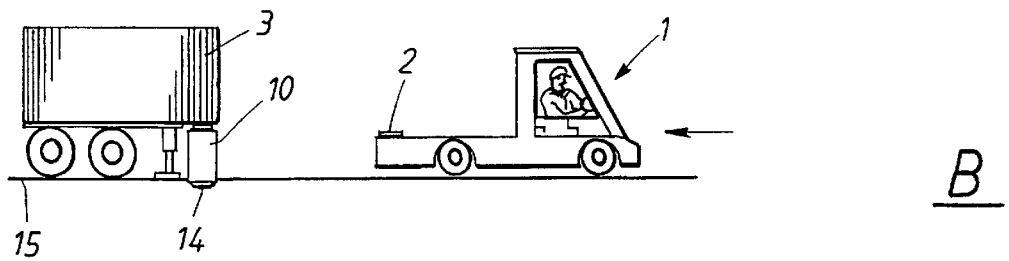
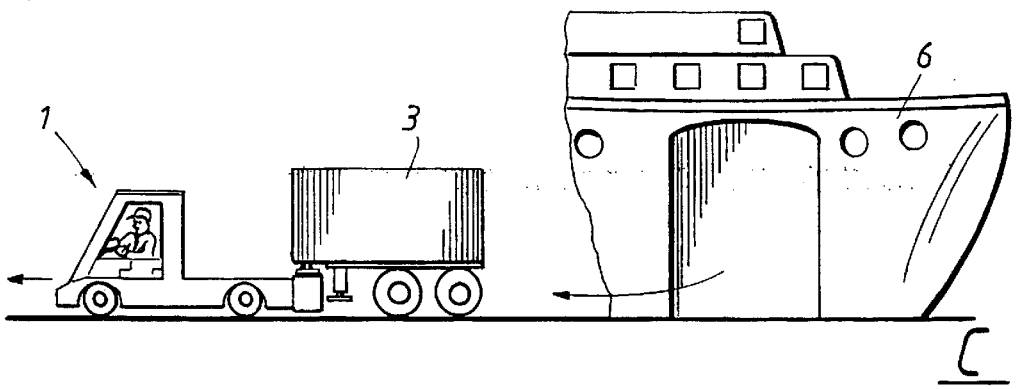
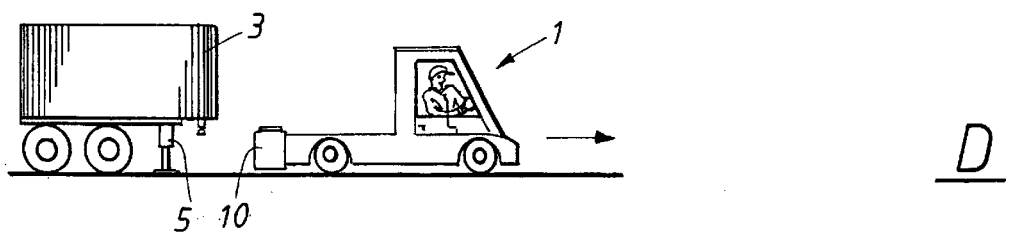
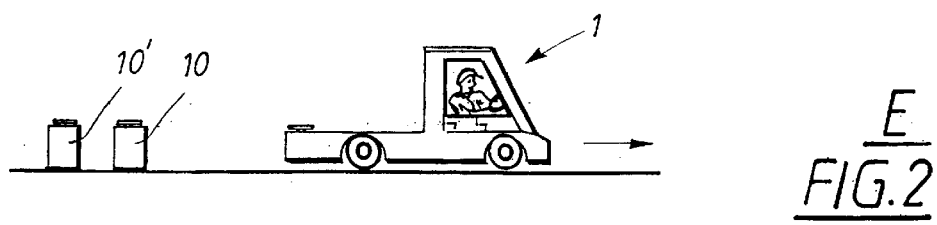
FIG. 2

METHOD AND A DEVICE FOR CHARGING, CARGO, SECURING AND DISCHARGING OF TRAILERS

TECHNICAL FIELD

The present invention relates to a method and a device for more efficient and safer ways for loading, securing and unloading trailers on so-called "Ro-Ro" ships (Roll on-Roll off) and in connection with other freight operations by sea, air or train.

TECHNICAL BACKGROUND

Today, freight by sea makes up a large proportion of the total global freight tonnage. Transportation by means of sea freight may i.a. be divided into bunker freight, container traffic and trailer freight. The latter may be defined as freight in which the goods are transported in a special transport trailer, without any appurtenant tractor unit accompanying the transport at sea. As a rule, loading an unloading takes place by means of special trucks, of so-called tug-master type, whereby trailers which are to be loaded are delivered to an indicated storage location at e.g. a harbour quay, while unloaded trailers are picked up by tractor units which transport the trailer to the final destination. Trailer freight is characterized in that the distances are relatively short, and in that it involves regular transportation with the purpose to continuously supply markets and production facilities with material. The so-called "just-in-time" strategy is nowadays applied by many manufacturing companies, implying that the build-up of buffer stocks in the production units is avoided. This, in turn, places increasingly large demands on fast and reliable deliveries from the raw material suppliers. The trailer traffic by Ro-Ro vessels has therefore become increasingly large and today a huge number of trailers are loaded and unloaded all over the world.

As a rule, a Ro-Ro vessel is nowadays in harbour for twenty-four hours at the most. A large proportion of this time is dedicated to the loading and unloading of trailers. Out of the total loading time, a large proportion is consumed by the securing or lashing of trailers in order to avoid cargo shifting at sea, with the entailing risk of accident. Also when unloading, unlashing etc. consumes a considerable amount of time. All this time consumption, naturally, gives rise to large costs.

The currently used method for loading trailers comprises a tractor unit driver placing his trailer at an indicated location at a quay. At this location, the trailer is placed on supporting members which are integrally arranged on the trailer. The so-called "kingpin" of the trailer, i.e. the towing pin, is thereby situated at between 1100–1700 mm height from the ground. This kingpin on the underside of the trailer is intended for coupling to a so-called fifth wheel, which is arranged on the back part of a tractor unit or a loading truck. Such fifth wheels are nowadays frequently used for lorries and comprise a tapering slot at one edge which opens out into a hole, having a wear ring which describes an arc of approximately 180° or more. When coupling up to a trailer, a tractor unit or a loading truck is manoeuvred into position so that the kingpin of the trailer, via the above-mentioned slot, gradually enters in the above-mentioned hole, whereafter a lock device is screwed tight or is tensioned so that the open portion of the arc, formed by the edge of the hole, is closed. This prevents the trailer from coming off the tractor unit. Furthermore, the fifth wheel is pivotally mounted on the tractor unit or the loading truck. A coupling of the type described makes it possible for the tractor unit or the loading truck to be turned in different directions in relation to the trailer, and additionally, to some extent, allows the tractor vehicle to be pivoted vertically in relation to the plane of the trailer.

When loading, the driver of the so-called tug-master, which is a special type of loading truck for this type of loading and unloading of trailers, collects the trailer at the quay and tows it onto the cargo deck. Since the length of the supporting members varies from trailer to trailer, the supporting members must often be cranked up when transporting the trailer from the quay to the cargo deck in order to avoid the supporting members of the trailer becoming stuck on the often upwardly bulging joint between the quay and the loading ramp or between the loading ramp and the cargo deck. When loading and unloading, a particular person is often required in order to perform this working step, i.e. to crank up the supporting members on trailers which are to be loaded.

When the loading truck has transported the trailer to its position on the deck, a trailer support, sometimes named a trailer trestle, is brought forward and is placed a distance behind the kingpin under the trailer. Thereafter, the trailer is lowered so that it rests on the support, which may have different designs within the scope of what is possible for the application. The trailer supports which are used today are not vertically adjustable which is a further reason why the integral supporting members of the trailer may have to be cranked up in order to achieve the right bearing of the trailer on the support. Trailer supports according to the prior art do not provide any special devices for latching to the deck, which is why it is necessary to secure the front end of the trailer with some kind of separate lashing means.

During the next stage, the trailer is therefore lashed to the deck by means of straps and/or chains. Chains are preferably used on the weather deck, while straps are used for the lashing on the lower decks. This stage is very labour intensive and is currently performed manually by 4 to 6 persons. The trailer is secured at 6 different points at the front part and at two points at the back part. In total 8 straps or chains are utilized which, when not in use, are available along the long sides of the cargo deck.

The working environment for the personnel working with loading and unloading, as described above, is characterized by noise from the loading truck, from the driver's cab of which the visibility furthermore is limited which increases the risk of collision accidents and trapping injuries to other personnel on the cargo deck. Furthermore, the work is done under extreme time pressure since, as earlier mentioned, it is extremely important to be able to load and unload as fast as possible.

Procedures similar to the ones described above are also used in connection with the loading and unloading of trailers on other vessels than just cargo vessels, for instance car ferries. Also certain types of trains or transport planes may be loaded in a similar manner. In all cases, the problems are similar to the ones described above.

SUMMARY OF THE INVENTION

Thus, it is an object of the present invention to provide a safe, time-saving and cost-effective method for loading, securing and unloading trailers in connection with freight by sea, air or train.

This object of the invention is achieved by means of a method in accordance with claim 1 with the use of a trailer support which, when loading trailers, by means of a first coupling member arranged on the trailer support is coupled to a first coupling means of a loading truck, and that said trailer support by means of a second coupling means is coupled to a second coupling member of a trailer, and that at least one lock device, arranged in the trailer support, is locked to at least one of a plurality of predefined locking points arranged in the floor of a cargo space in order to achieve a securing of the front end of said trailer.

If necessary, separate cargo lashing means are utilized for securing the back end of the trailer, whereby said separate cargo lashing means comprise attachment means which are locked into the same type of predefined locking points in the floor of the cargo space as the ones used when securing the front end of the trailer by means of the lock device of said trailer support.

A further object of the present invention is to provide a device in the form of a trailer support which provides a simple and reliable support function for supporting the front part of a trailer when parked, and also comprises means which facilitates transportation of the trailer support by means of a loading truck, and that the support moreover comprises means for coupling to the underside of a trailer and for securing to a deck of a vessel.

This object is achieved by means of a device according to claim 6, in the form of a trailer support comprising a first coupling member for coupling to a first coupling means on a loading truck, and that said trailer support comprises a second coupling means for coupling to a second coupling member on a trailer, and that said trailer support comprises at least one lock device with a locking member for locking said trailer support to at least one of a plurality of locking points arranged in the floor of a cargo space.

The present invention makes it possible for a single loading truck with driver to handle the entire loading, cargo securing and unloading operation alone, something which implies large time and cost savings.

BRIEF DESCRIPTION OF THE DRAWINGS

In the following, the invention will be described in greater detail with reference to the attached drawings, in which FIG. 1 in the sub-drawings 1A–1E schematically depicts different steps when loading according to the invention, FIG. 2 in the sub-drawings 2A–2E schematically depicts different steps when unloading according to the invention, FIG. 3 schematically illustrates a trailer support according to an embodiment of the invention.

DETAILED DESCRIPTION OF PREFERRED EMBODIMENTS

Figure 3:
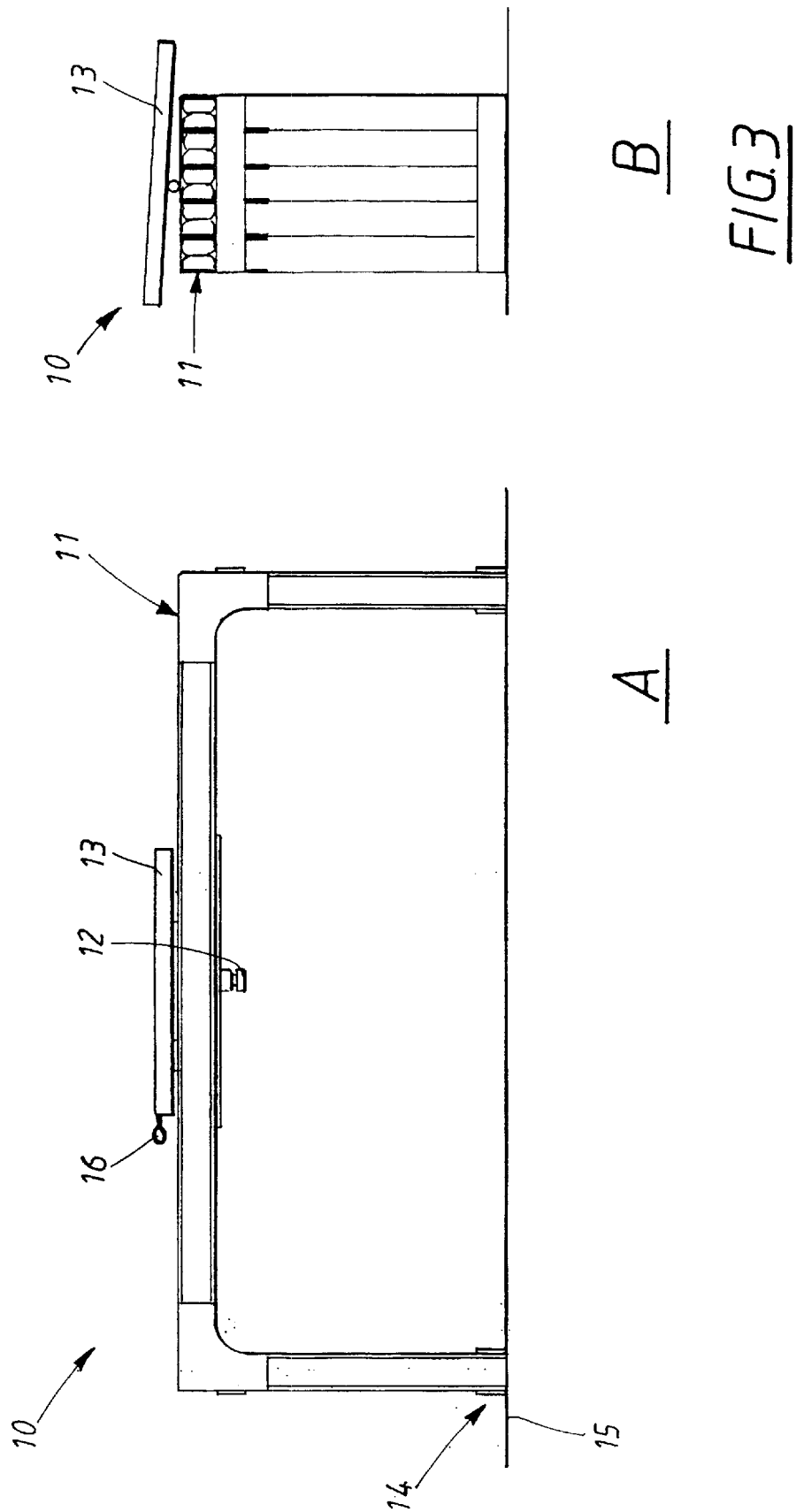

According to a preferred embodiment of the method according to the invention, illustrated in FIG. 1, when loading, a loading truck 1 firstly collects a trailer support 10 from a depot for trailer supports 10, 10' and thereby couples the kingpin 12 of the trailer support to the fifth wheel 2 of the truck (FIG. 1A) Thereafter, the truck collects a trailer 3, which by means of a conventional tractor unit has been parked on a quay or another depot for trailers, and couples the fifth wheel 13 of the trailer support 10, coupled to the truck 1, to the kingpin 4 of the trailer (FIG. 1B). If necessary, the integral support members 5 of the trailer are thereafter cranked up by the truck driver. Thereafter, the trailer support 10 with its attached trailer 3 is transported onto the cargo deck of a vessel 6 by the truck 1 (FIG. 1C), where at the trailer support 10 and the attached trailer 3 is put down and locked to the deck 15 of the vessel by means of lock devices 14, situated on the lower portion of the trailer support 10 (FIG. 1D). The lock devices 14 are connected to the cab via a rack 14a, which is schematically represented by line 14a. The lock devices 14 are manoeuvrable from the cab by the driver via hydraulic means 14b connected to the rack 14a. The truck driver thereafter disconnects the trailer support 10 with attached trailer 3, now locked to the deck 15, from the truck 1 and the truck 1 is ready to collect another trailer support and thereafter another trailer, etc.

According to the invention, the rear end of each trailer put down on the cargo deck is, if necessary, secured with a special type of lashing means in the form of straps or chains (not shown) which are provided with lock devices of so called twist-lock type, which are intended to facilitate rapid and reliable locking to and unleashing from the same type of locking points as earlier mentioned. Said locking points are arranged in the cargo deck of the vessel in a suitable pattern.

When unloading, illustrated in FIG. 2, and after the above-mentioned cargo lashing means for securing the back end of the trailer have been removed, the loading truck 1, now without any trailer support, is driven onto the cargo deck 6 of the vessel (FIG. 2A). The loading truck is manoeuvred into position under a trailer support 10 with attached trailer 3 and couples up the downwardly protruding kingpin to the fifth wheel 2 of the truck. From his driver's cab, the truck driver thereafter unlocks the lock device 14 of the trailer support via hydraulic means 14b from the locking points in the deck 15 of the vessel (FIG. 2B), after which the unit is driven off the cargo deck of the vessel 6 (FIG. 2C). The trailer is thereafter parked at an indicated location with the help of its integral supporting members 5, the trailer support 10 is disconnected from the trailer 3 (FIG. 3D) and is transported by the truck 1 to a depot for trailer supports 10, 10', where the trailer support 10 is disconnected from the truck 1 (FIG. 2E), whereafter the truck can drive onto the cargo deck in order to collect the subsequent trailer support with its attached trailer, etc.

According to a preferred embodiment of the method according to the invention, the driver of the loading truck handles the coupling and disconnecting of the trailer support to and from the truck. From the driver's cab, the truck driver furthermore operates the locking and unlocking of the lock device in the lower portion of the trailer support for locking and unlocking to the locking points of the cargo deck. When loading, the only remaining manual handling is, if necessary, to secure the back end of trailers which have been parked with the help of straps or chains provided with lock devices and, before unloading, to unleash and remove said straps or chains from the rear end of the trailer. These work operations may advantageously be performed by the truck driver when the loading has been finished and before unloading starts, respectively.

The method according to the invention is of course not limited to use when loading, securing and unloading cargo vessels, but may also be used for similar procedures in connection to other types of trailer freight, for instance, transportation by train or air.

In FIG. 3, there is shown a preferred embodiment of the device according to the invention. The device consists of a trailer support 10, comprising a supporting means 11, a coupling member in the form of a kingpin 12 on the underside of the supporting means, for coupling to a coupling means in the form of a fifth wheel on a loading truck or the like, a coupling means on the upper side of the support 10 in the form of a fifth wheel 13 for connecting to a coupling member in the form of a kingpin of a trailer, said fifth wheel thereby being provided with a locking device 16 for securing the kingpin of the trailer. The locking device 16 may be manoeuvrable manually or manoeuvrable remotely by means of e.g. hydraulics. Furthermore, the trailer support 10 comprises a lock device 14, manoeuvrable remotely, for locking to or unlocking from a locking point in a deck 15 of a vessel. The supporting means 11 of the trailer support preferably has the shape of an inverted u, and is designed so that its strength is sufficient for the stresses which are expected to occur when a fully loaded trailer, of the type which normally is used for this type of transport, is exposed to external forces when loading or unloading, or for instance the rolling of a vessel caused by heavy sea. The coupling member 12 on the underside of the supporting means 11 fits into the fifth wheel of a loading truck in order to enable transportation of the trailer support 10 with or without attached trailer. Said coupling member 12 is preferably constituted of a kingpin. The coupling means 13 on the upper side of the supporting means 11 fits into the kingpin of the trailer to which the trailer support 10 is to be couples, enabling a simple coupling to and disconnecting from a trailer. Said coupling means 13 is preferably constituted by a fifth wheel. The fifth wheel 13 is to some degree transversally turnable which enables it to follow the movement of the trailer when, for instance, driving on ramps, but can still pivot sufficiently in order to adapt to different angles of a trailer, which has been parked, when it is locked to e.g. a deck of a vessel. The stability and the strength of the coupling, secured by means of the locking device 16 between the fifth wheel 13 on the upper side of the supporting means 11 and the kingpin attached to the underside of the trailer, is such that it is able to accommodate the loads which is may be exposed to when loading and unloading. Furthermore, the coupling provides sufficient stability and tenacity in order to provide an adequate securing of the cargo, which replaces normal lashing of the front end of the trailer during transportation. The lock mechanism 14 provides a system, which is manoeuvrable by a driver from a driver's cab of a loading truck via rack 14a and hydraulic means 14b, for locking the trailer support 10 to locking points in a deck 15 of a vessel or the like.

Figure 4:
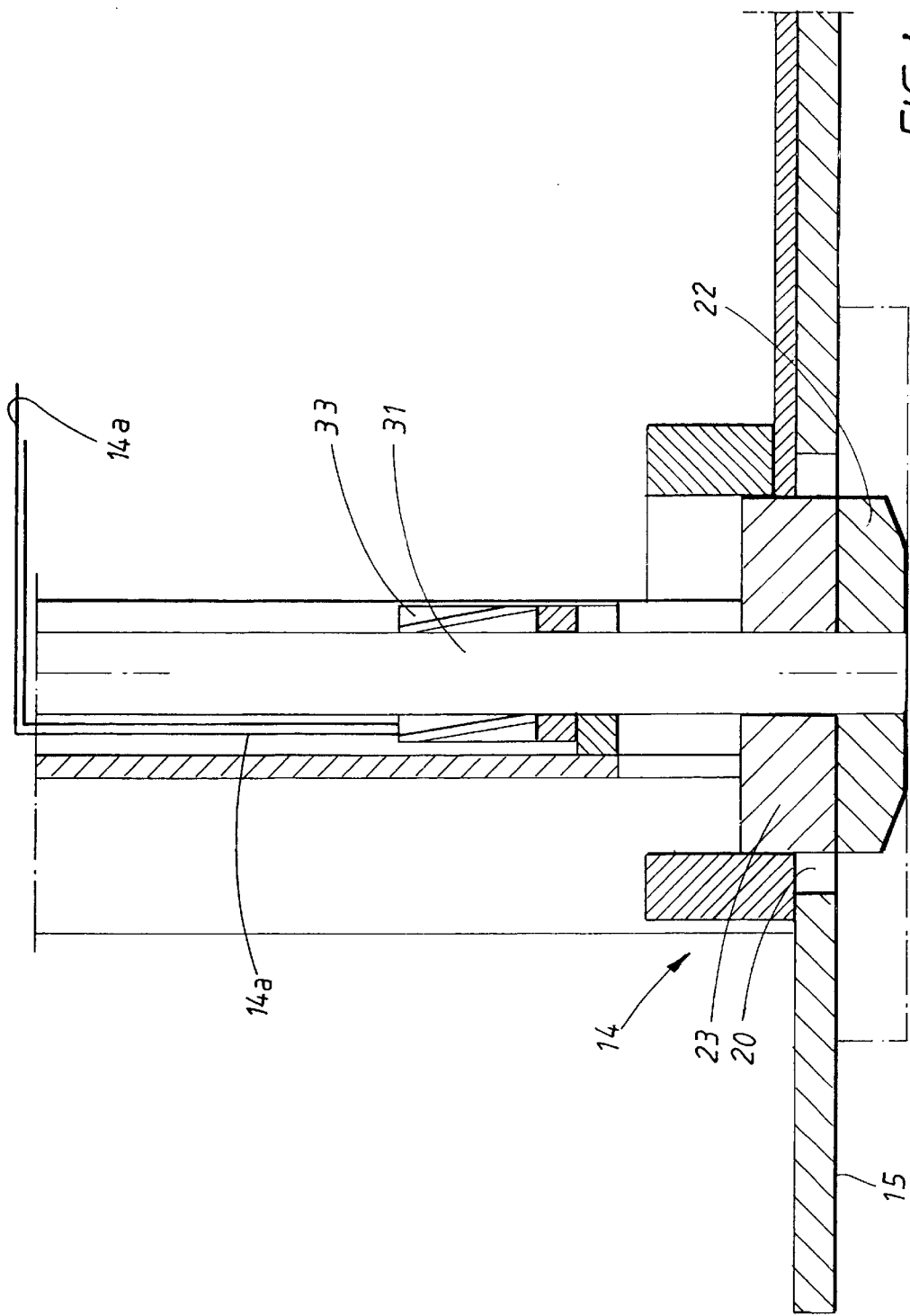
FIG. 4 is a detailed view of a lock device for locking a trailer support according to the invention to a deck of a vessel or to another floor surface in a cargo space, and FIG. 5 with different views schematically illustrates a further design of a trailer support according to the invention.

In FIG. 4, the lock device 14 of the above-mentioned trailer support 10 on FIG. 3 is illustrated. The lock device 14, which preferably is of a so called twist-lock type, comprises a locking member 22 which consists of a rotatable rectangular disc which is lowered into a rectangular, recessed through-track 20 which has been prepared in a deck 15. In order to prevent the deck 15 from being weakened, the recessed through-track is hollowed out in the deck 15 in positions in connection to transverse deck beams. Advantageously, the recessed through-tracks 20 in the deck have the dimensions 160×80 mm. When locking the trailer support, this is placed with its lower portion in position over the recessed tracks 20 in the deck. As earlier mentioned, the trailer support is advantageously designed as an inverted U in order to resist the stresses it may be exposed to in the present application. The trailer support is preferably provided with two lock devices in the "legs" of said inverted U, i.e. normally four lock devices per trailer support. The locking member 22, in each lock device 14 of the trailer support, is spring-loaded and is, by means of springs (not shown), pressed into each respective rectangular recessed track in the deck when the lower portion of the trailer support is in the correct position. As regards placement on an even surface, said springs (not shown) allow the locking member 22 to travel up into the supporting means of the trailer support. By means of two hydraulic means 14b, manoeuvrable from the driver's cab of the truck, which are connected to a rack 14a and traveling along each trailer support's lower portion ("leg"), a shaft 31 is turned by means of a gear ring 33 which in turn turns the rectangular locking member 22, attached to said shaft 31, approximately 90° in the plane of the deck. In this manner, a locking is obtained thanks to the rectangular, recessed through-track 20. The recessed through-track constitutes an open hole for insertion of the respective locking members 22, which thereafter are turned under the deck 15 approximately 90° in the plane of the deck in order to achieve locking. The above-mentioned hydraulic means 14b acts on the rack situated in each "leg" of the trailer support's inverted U-shape. The rack 14a in turn acts on the respective gear ring 33 thus the lock devices in each leg of the inverted U-shape, are conjugately synchronized. The edges at the underside of the recessed through-tracks 20 through the deck 15, and the edges on the upper side of the locking member 22, are preferably beveled in order to make it possible to achieve a rigid locking without any play. The beveling angle should be comparatively small in order to prevent the shaft 31, with attached locking member 22, being shaken loose from its locked position due to vibrations. The beveling of the edges at the underside of the through-tracks 20 in the deck 15 are preferably approximately 2 mm bevel of the edges at the periphery of the track, as compared to the underside surface of the deck 15. The upper edges of the locking member 22 are preferably beveled to the corresponding extent, which gives a total play between the locking member 22 and the underside of the deck 15 of 4 mm when engaging and a play which approaches zero when the locking member 22 has been turned about 90° in the plane of the deck, when locking. In addition, the lower edges of the locking member 22 are preferably beveled in order to facilitate insertion into the recessed tracks. Before turning the locking member 22, the lock guide 23 protrudes down into the recessed track 20 in the deck to a depth which corresponds to the thickness of the deck 15 in order to enable the locking member 22 to be turned freely under the deck 15. The turning of the locking member 22 by means of the hydraulic means 14b, which acts on the above-mentioned rack 14a, acting on the gear ring 33 attached to the shaft 31, is controlled by means of the oil pressure in the cylinders of each respective hydraulic means. In this manner, turning of the locking member 22 approximately 90° corresponds to a certain oil pressure. This control is preferably constituted by a valve (by-pass valve) which opens when the desired pressure has been achieved, and an indication means which provides an indication to the truck driver when the desired pressure has been reached. Furthermore, each hydraulic device 14b is provided with a position transmitter (not shown) which indicates that a minimum allowed engagement, i.e. turning of the locking member 22, has been reached. When all four transmitters (two pressure transmitters and two position transmitters per trailer support) record desired values, this is indicated in the driver's cab of the loading truck. The trailer support is now securely locked and the loading truck can move on. When unlocking, the pressure transmitters are disconnected since, due to settling during the transport, it is now possible that a higher pressure is required than when locking. The truck driver will instead receive an indication that each hydraulic means has passed its smallest engagement position and is now returning.

Preferably, it is also arranged that the truck driver receives an indication that all locking members have reached their unlocked position before the trailer support is lifted up for transfer.

Figure 5:
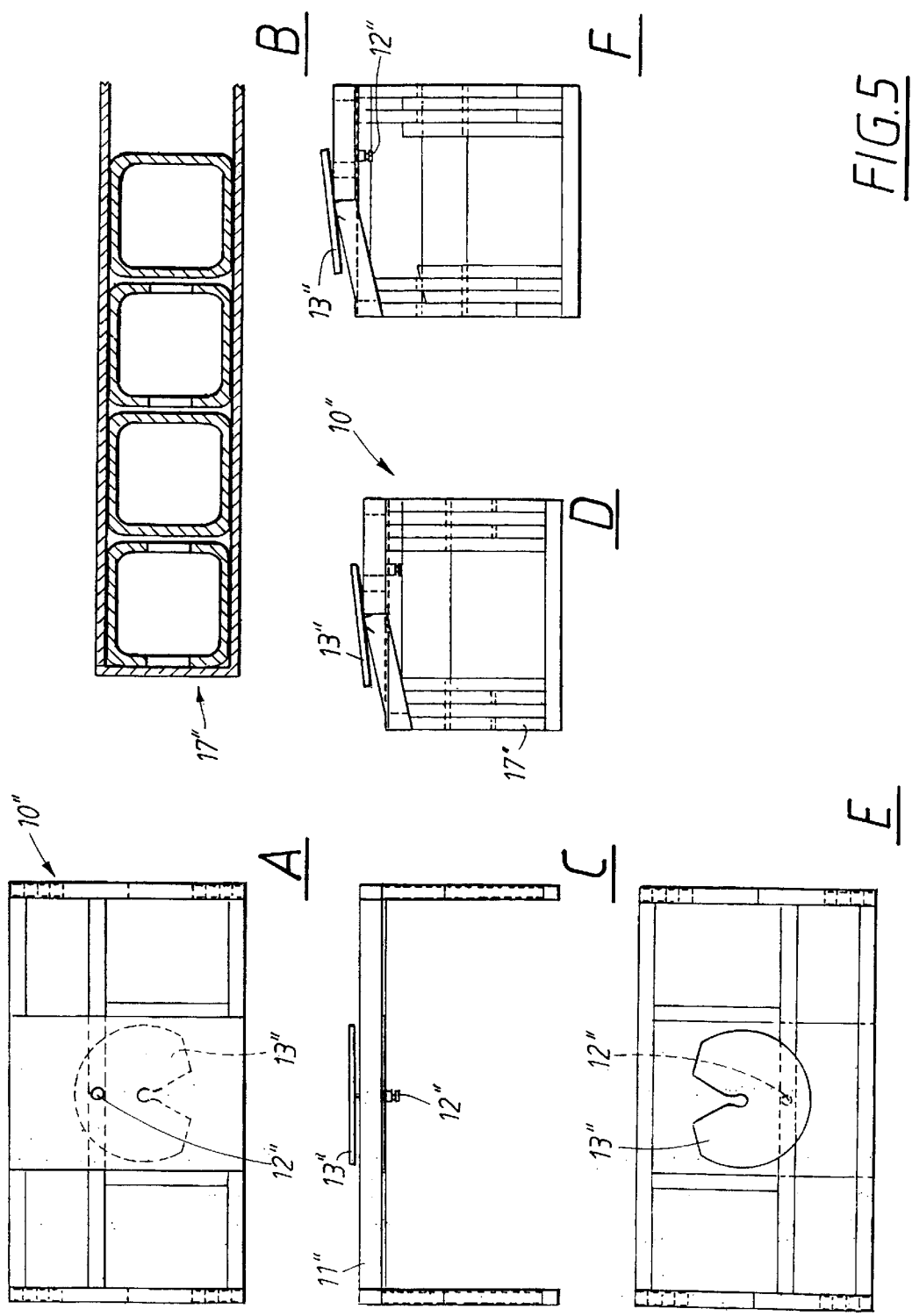

In FIG. 5 there is schematically illustrated a further design of a trailer support 10" according to a preferred embodiment of the invention, wherein FIG. 5A is a view of the trailer support seen from below. FIG. 5B is a detailed illustration in cross section of the beam construction 17" of the trailer support, FIG. 5C is a front view of the trailer support, FIGS. 5D and 5F are side views of the trailer support, and FIG. 5E is a view seen from above. From FIGS. 5D and 5F together, it is evident that the trailer support according to the present embodiment is vertically adjustable, whereby the trailer support in FIG. 5D is in its lowest position, and in FIG. 5F in its highest position. If necessary, this makes it possible to impart different heights, above the ground or above a floor in a cargo space, to the coupling members 12" and the coupling means 13" of the trailer support 10". The height of the support may be regulated either manually, by means of a crank/screwing device or the like, or it is also conceivable with a hydraulic or pneumatic system, raising or lowering the trailer support, and which is manoeuvrable from the driver's cab of the loading truck. Regulating the height of the trailer support may be advantageous for adapting to different heights of different trailers, or may make it possible for a driver of a loading truck not to leave his driver's cab in order to e.g. crank up integral trailer supporting members or the like.

Practising the invention according to the preferred embodiments presumes that recessed tracks, of a suitable design for locking trailer supports, are arranged in a suitable pattern on the deck of the vessel or the cargo space floor. In order to facilitate the work of the truck driver, directional lines and other position markings are preferably also provided.

The present invention is by no means limited to be practised according to the above-mentioned embodiments or as shown in the attached drawings but may be varied within the scope of protection conferred by the accompanying claims. As mentioned by way of introduction, the cargo space may be arranged in a transport plane, in an open or covered railway carriage or the like.

What is claimed is:

1. A trailer support for loading, securing and unloading a trailer by means of a loading truck comprising:
   a support member including a horizontal member and a pair of legs, each of said pair of legs including an upper end attached to said horizontal member and a lower end, wherein said support member is an inverted U-shaped member;
   a first coupling member for coupling said support member to said loading truck;
   a second coupling member for coupling said support member to said trailer; and
   at least one lock device located in said lower end of at least one of said pair of legs, wherein said lock device is capable of locking said trailer support to predefined locking points arranged in a floor of a cargo space, wherein said at least one lock device is operable from a driver's cab in said loading truck.

2. A trailer support according to claim 1, wherein said at least one lock device is a turnable twist-lock.

3. A trailer support according to claim 1, wherein said trailer support is adapted to be loaded, secured and unloaded by a single person.

4. A trailer support according to claim 1, wherein said first coupling member is a kingpin.

5. A trailer support according to claim 4, wherein said second coupling member is a fifth wheel.

6. A trailer support according to claim 1, wherein said second coupling member is a fifth wheel.

7. A trailer support according to claim 1, wherein a height of said first coupling member and said second coupling member above the ground is vertically adjustable.

8. A trailer support for loading, securing and unloading a trailer by means of a loading trailer comprising:
   a support member including a horizontal member and a pair of legs, each of said legs including an upper end attached to said horizontal member and a lower end, wherein said support member is an inverted U-shaped member;
   a kingpin for coupling said support member to said loading truck;
   a fifth wheel for coupling said support member to said trailer; and
   at least one turnable twist-lock at said lower end of at least one of said pair of legs, wherein said twist-lock is capable of locking said trailer support to predefined locking points arranged in a floor of a cargo space, wherein said at least one turnable twist-lock is operable from a driver's cab in said loading truck.

9. A trailer support according to claim 8, wherein said trailer support is adapted to be loaded, secured and unloaded by a single person.

10. A trailer support according to claim 8, wherein a height of said kingpin and said fifth wheel above the ground is vertically adjustable.

* * * * *